Aug. 23, 1966  W. HÜTTER  3,268,642
METHOD OF AND DEVICE FOR MAKING PRESSBOARDS AND THE LIKE
Filed April 5, 1963  6 Sheets-Sheet 6

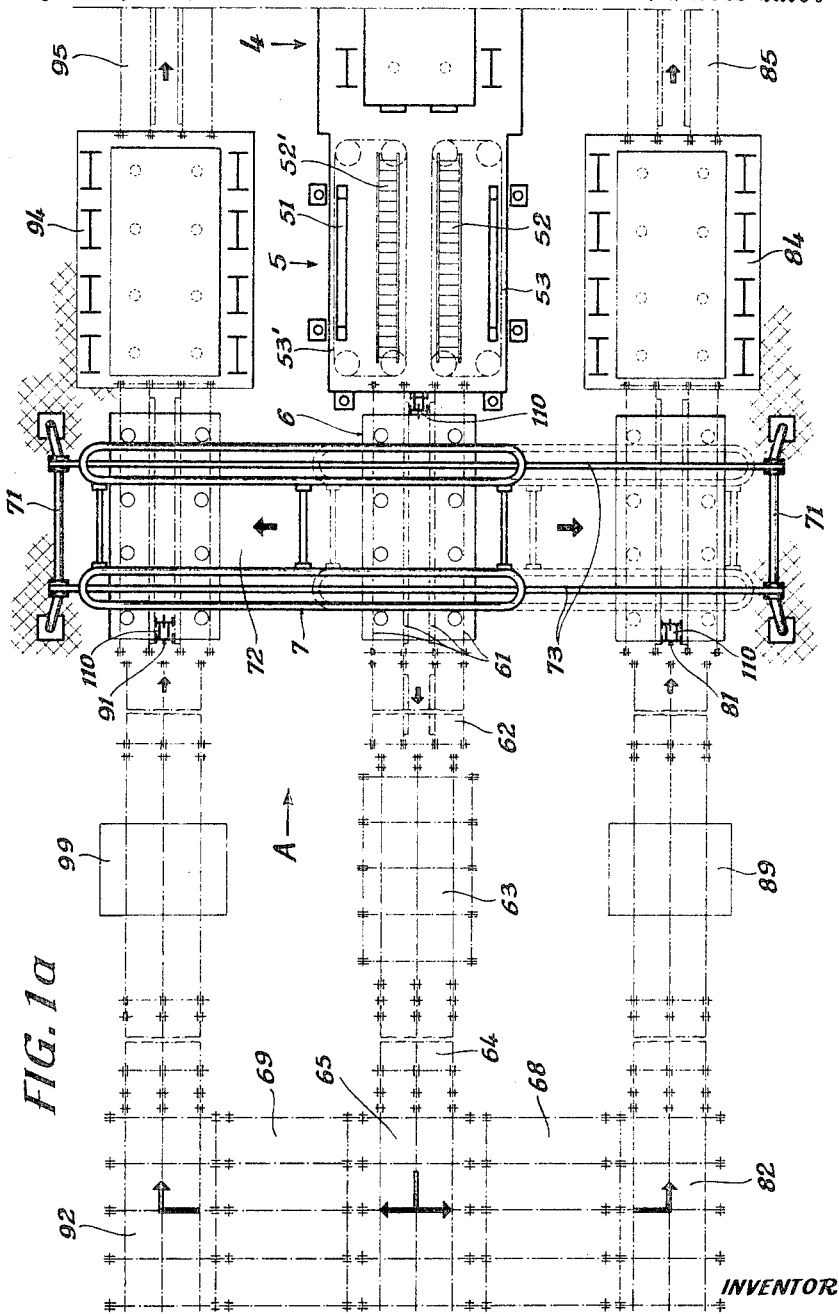

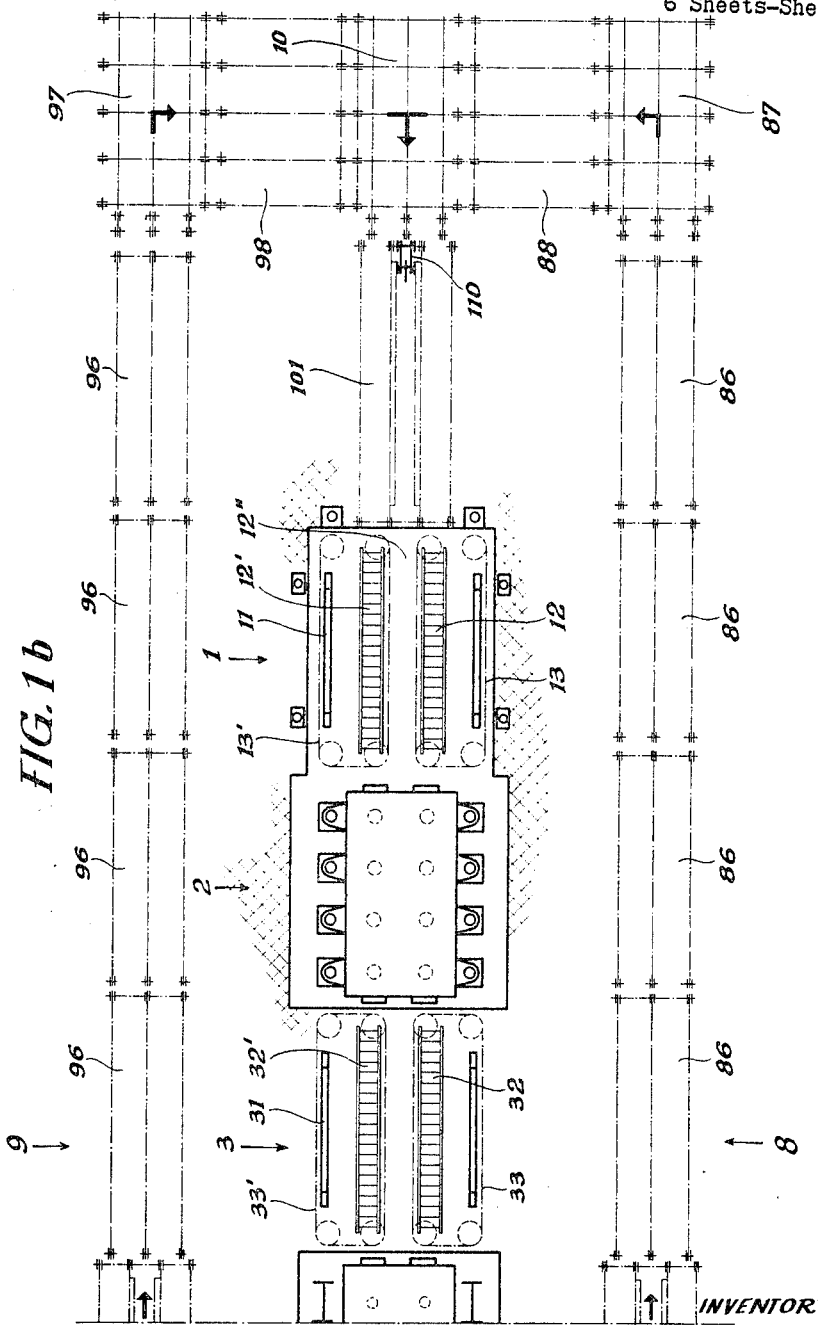

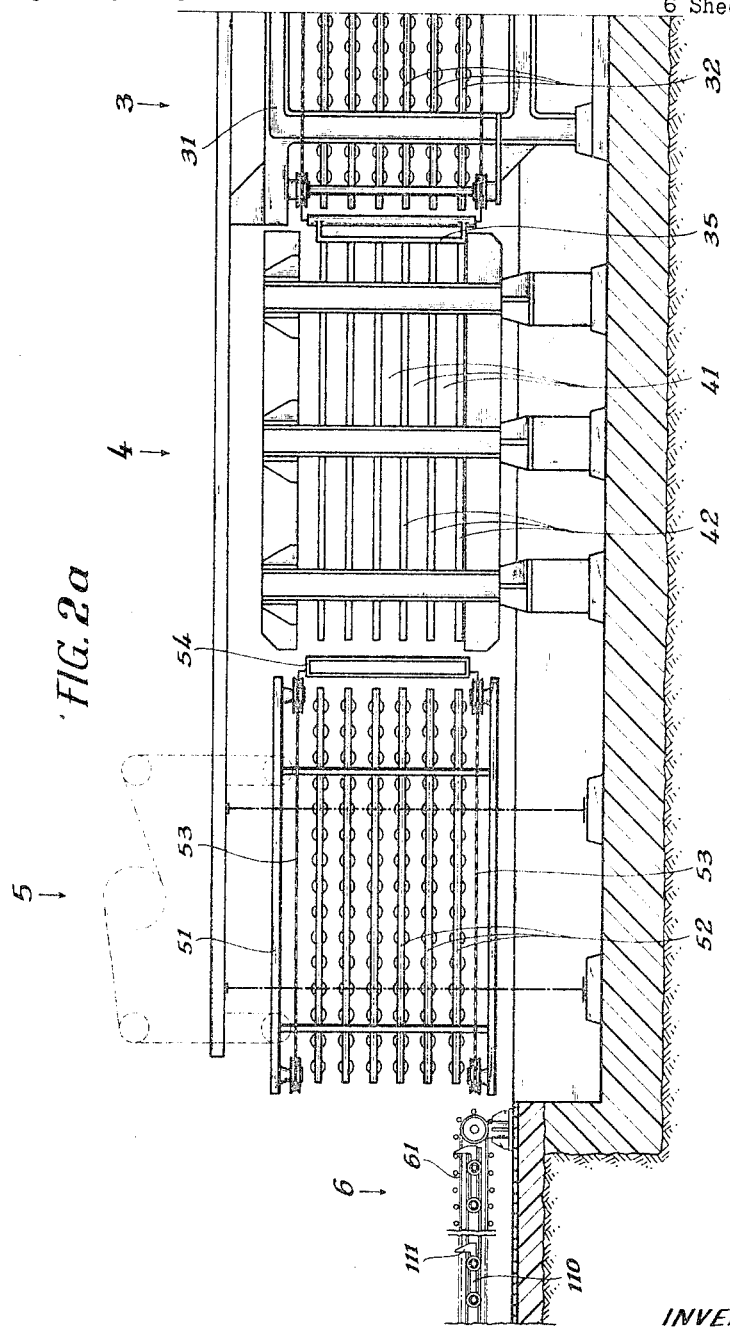

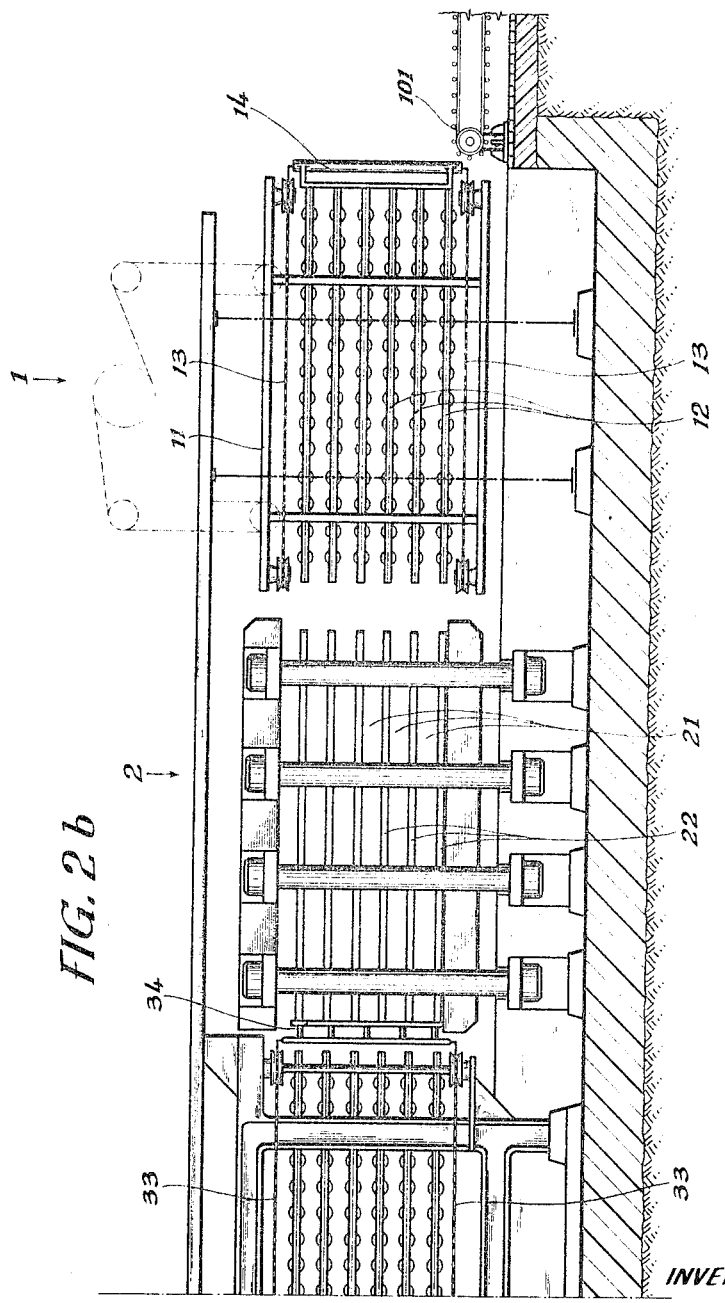

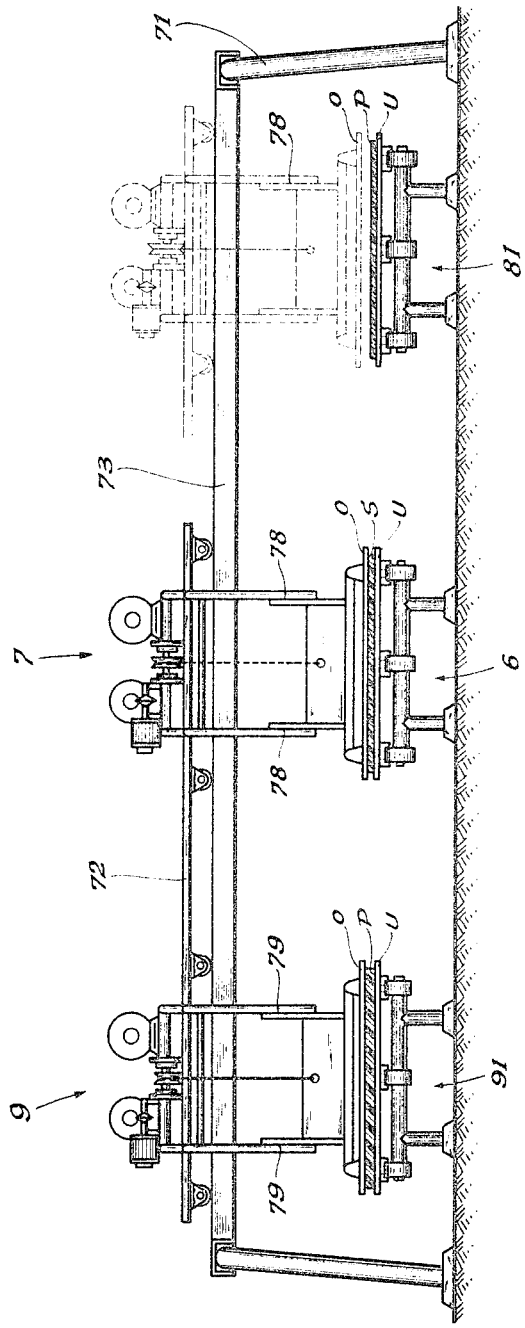

INVENTOR
Wilhelm Hütter

United States Patent Office 3,268,642
Patented August 23, 1966

3,268,642
METHOD OF AND DEVICE FOR MAKING
PRESSBOARDS AND THE LIKE
Wilhelm Hütter, Krefeld, Germany, assignor to Niederrheinische Maschinenfabrik Becker & van Hüllen, Krefeld, Germany
Filed Apr. 5, 1963, Ser. No. 270,851
Claims priority, application Germany, Apr. 11, 1962, N 21,442
4 Claims. (Cl. 264—120)

The present invention relates to a method of and device for making pressboards in a continuous operation and, more specifically, by means of an arrangement which comprises a heating press and a subsequent cooling press or conditioning press with associated conveying, loading and discharging means which convey the material to be pressed to and from the respective presses, said material being prepared at charging or conveying stations and placed on trays.

With heretofore known installations for making pressboards in a continuous method, the receiving plates or trays are conveyed through a charging station and on conveyor paths in one and the same plane up to the loading device for the press. The loading device has a plurality of shelves corresponding in number to the superimposed compartments of the multi-layer press, so that each shelf of the loading device has to be provided with a supporting plate or tray and the material to be pressed before the entire set can simultaneously be introduced into the opened multi-layer press. The pressing time required in the press for the proper pressing of the material to pressboards is the time which is available for the preparation of a set of trays with press material placed thereon. As long as the pressing time in the multi-layer press is relatively long while the press has only a low number of superimposed compartments, a relatively considerable period of time will be available for preparing the next group of sets, i.e. trays with the material to be pressed thereon. The greater the number of compartments of the multi-layer press and the shorter the pressing time becomes, the more unfavorable will be the ratio between pressing time and preparing time. Since as preparing time of an individual set, a certain minimum of time is necessary, it may occur that the pressing time of the multi-layer press will be less than the preparing time for a group of sets to be charged into the multi-layer press. This means that in such an instance, the multi-layer press will, in view of its standstill periods, become economically prohibitive. This is not admissible in view of the relatively high costs of operation of a multi-layer press.

The development of the pressboard art has, in the meantime, brought about such shortened pressing periods that the time periods for the preparation of sets to be pressed have become totally disproportionate with regard to the pressing periods.

It is, therefore, an object of the present invention to provide a method of and device for making pressboards, which will overcome the above-mentioned drawbacks.

It is another object of this invention to provide an improvement in the making of pressboards, which will reduce the time heretofore required for preparing the sets to be pressed for loading into the multi-layer press.

It is a still further object of this invention to provide a method of and device for making pressboards which, in addition to permitting a more economical exploitation of the machine, will also result in an improvement of the finished product.

These and other objects and advantages of the invention will appear more clearly from the following specification in connection with the accompanying drawings, in which:

FIGURE 1 is a diagrammatic top view of an entire installation for carrying out the method according to the present invention;

FIGURE 2 illustrates on a somewhat larger scale than FIGURE 1 a side view of the actual press unit with loading and unloading means, FIGURE 2 illustrating that portion of FIGURE 1 which is encircled by dot-dash lines;

FIGURE 3 is an end view of FIGURE 1 as seen in the direction of the arrow A;

Figure 4A:
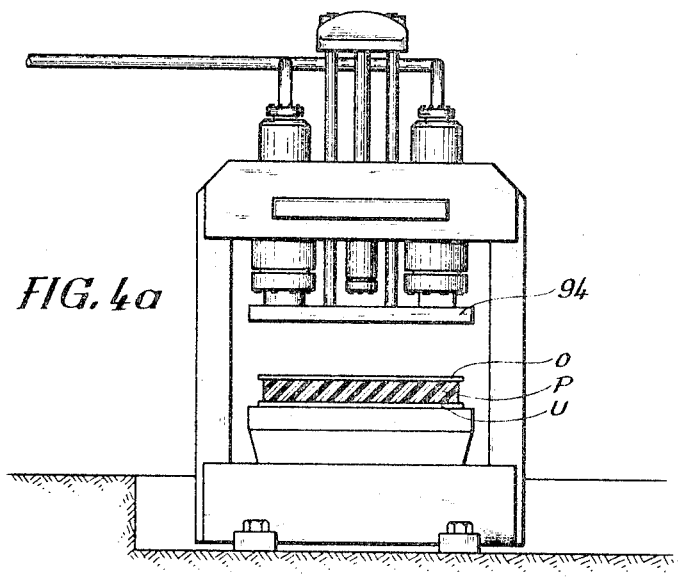
FIGURE 4 illustrates an end view of two preliminary pressing devices, one being shown in open and the other being shown in pressing position.
Figure 4B:
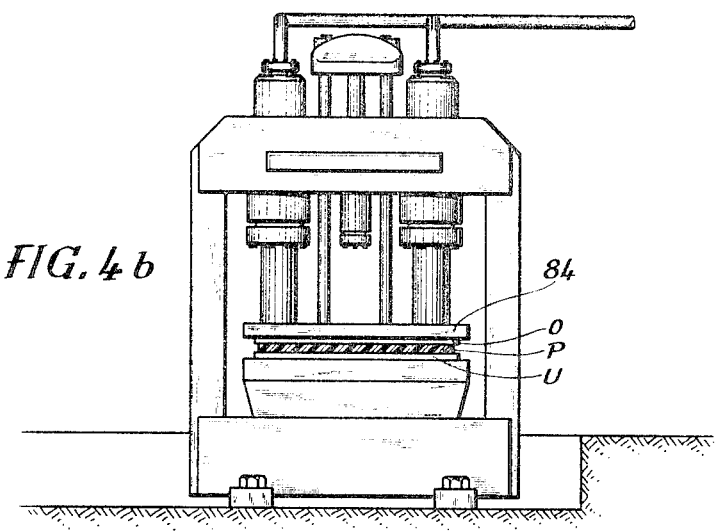

It has been found, according to the present invention, that in spite of a further reduced pressing period, it is possible better to adapt the preparing time to the pressing period. More specifically, the method of making pressboards according to the invention is carried out by making up the sets to be introduced into the multi-layer press of one tray each, the material thereon which is to be pressed, and a cover plate covering said material. The last-mentioned cover plates are, at a certain rhythm, withdrawn from the said sets when the latter leave the discharging device pertaining to the cooling or conditioning press. More specifically, said cover plates are at a certain rhythm and alternately deposited on two trays loaded with new material to be pressed and located at both sides of the press unit, where they are pre-pressed and subsequently conveyed to the start of the pressing unit. The loading device which receives the sets to be pressed from said sides is subjected to a lifting and lowering operation. In cooperation with such lifting or lowering operation, the loading is effected in such a way that every other shelf is loaded and after completion of the loading of all of the shelves, the group of sets is moved into the heating press where it is subsequently pressed. From the heating press the pressed set is conveyed to the cooling press or conditioning press and from there to the discharging device. The individual sets of the finished group are withdrawn individually in such an order that every other set is being withdrawn. In this way, the full capacity of the heating press can be exploited even though the pressing time proper has been considerably reduced.

A device for carrying out the method according to the present invention preferably comprises a pressing installation which includes a loading device, a heating press, a discharging and loading device, a cooling press, a conditioning press, and a discharging device. In addition thereto, at both sides of the pressing installation and parallel thereto are provided filling and conveying tracks each of which includes a pouring device for the material to be pressed, a pre-press, conveyor means, and transverse conveyors at the start and at the end of the conveyor tracks. Furthermore, there is provided a double-acting suction device which is located adjacent the discharging device of the cooling or conditioning press. By means of said suction device, cover plates employed in connection with the pressing operation are withdrawn from pressed units and deposited on material to be pressed and prepared on said filling and conveying tracks.

The said suction device includes a framework arranged above the conveyor tracks and transverse thereto. Said framework serves as track for a reciprocable suction carriage with two suction devices connected thereto. The longitudinal axes of said suction devices are substantially parallel to the conveyor tracks and extending in the direction thereof, while the distance between each two suction units corresponds to the distance between the longitudinal axis of the pressing installation and the longitudinal axis of the conveyor track.

An essential part of the entire arrangement is formed by the devices pertaining to the pressing installation proper.

These devices, when looking at them sequentially, comprise a loading device 1, a heating press 2, a discharging and loading device 3, a cooling or conditioning press 4, and a discharging device 5. The loading device 1, the subsequent discharging and loading device 3, the cooling and conditioning press 4, and the discharging device 5 have the same number of superimposed shelves or compartments as there are superimposed compartments 21 in the heating press 2. The loading device 1 comprises, in a manner known per se, a basket frame 11 which is movable upwardly and downwardly and has its longitudinal sides provided with roller gangs 12, 12' spaced from each other by a distance 12". Each shelf comprises a pair of roller gangs 12, 12'. The basket frame 11 comprises the same number of superimposed roller gang pairs 12, 12' as there are superimposed compartments 21 in the heating press 2. For purposes of moving a complete group of sets from the loading device 1 into the heating press 2, there are provided, in a manner known per se, vertically arranged movable bars 14 which are mounted between two superimposed endless chains 13, 13'. Each of said sets of a group is made up of a bottom plate U, the material to be pressed P, and a top plate O covering said material P.

Arranged at each longitudinal side of the basket frame 11 is a chain pair 13, 13' of which always one of the chains of a chain pair 13, 13' circulates above the bottom of the basket frame 11 in horizontal direction, while the other one of the chains of the chain pair circulates below the top of the basket frame 11 in horizontal direction. Between each of the chain pairs 13, 13' formed in this manner, there is vertically guided a bar 14. The circulation of the chain pairs 13, 13' with the bar 14 pertaining thereto is so adjusted that the bars 14 will alongside each other pass through the space 12" between the roller gangs 12, 12' in the direction toward the heating press 2 and will return along the outside of the roller gangs. At the start of the movement of the groups of sets into the press unit as effected by the bars 14, the said bars will from the filling side of the loading device 1, simultaneously engage all of said bottom plates U and top plates O from the filling side of the loading device 1 at both sides of the vertical longitudinal central plane and will, when continuing their movement, respectively move the superimposed sets into the various compartments 21 of the heating press 2. In said heating press there is effected a pressing of the material P between the respective bottom plates U and top plates O so as to form pressboards S. This pressing operation is effected by moving the heating plates 22 of the heating press 2 in vertical direction toward each other under pressure while the heating plates 22 forming the individual compartments 21 are simultaneously heated.

The discharge side of the heating press 2 is followed by an intermediate discharging and loading device 3. This combined discharging and loading device 3 is likewise made up by superimposed roller gang pairs 32, 32', the number of superimposed pairs corresponding to the number of superimposed compartments 21 of the heating press 2. The said roller gang pairs 32, 32' are arranged at both longitudinal sides of a stationary frame 31 in such a way that the level of said roller gang pairs corresponds to that of the compartments 21 in heating press 2 when the latter is in its open position. The discharging and loading device 3, similar to the loading device 1, has two bars 34 vertically guided between endless chain pairs 33, 33'. These bars will when being circulated, first catch behind extensions at the front edges of the bottom plates U and top plates O and protruding beyond the outer edges of the heating plates 22. When further circulating, the bars 34 pull the complete group of bottom plates U with pressboards S thereon and top plates O out of the heating press 2 and into the discharging and loading device 3. During the further circulation of the chain pairs 33, 33', two further bars 35 vertically guided between chain pairs 33, 33' engage the rear edges of the bottom plates U and top plates O and push the groups of bottom plates U with the pressboards S and top plates O thereon into the cooling or conditioning press 4. The cooling plates 42 forming the individual compartments 41 of said cooling or conditioning press 4 are, following the movement of the cooling plates 42 toward each other, cooled by means of a coolant passed through said cooling plates. In this way, the cooling effect is also conveyed to the bottom plates U, the pressboards S thereon, and the top plates O.

From the cooling or conditioning press 4 in which the pressboards S remain for the same period as they were in the heating press 2, the pressed and cooled pressboards S are, together with the likewise cooled bottom plates U and top plates O, moved into the discharging device 5. This discharging device 5 is designed similarly to the loading device 1 with the sole difference that the bars 54 vertically guided on endless chain pairs 53, 53' catch behind extensions at the front edges of the bottom plates U in the cooling or conditioning press 4 and pull said plates U together with the pressboards S and top plates O thereon from the cooling or conditioning press and move the same onto the roller gang pairs 52, 52' of the discharging device 5. The sets of the group of sets now in the discharging device 5 are individually removed from the latter and conveyed to a removing station 6. The removal of the individual sets from the discharging device 5 is effected at a certain rhythm in such a way that every other set is being removed. This takes place during a lifting and lowering operation of the basket frame 1 with the roller gang pairs 52, 52', one lifting and one lowering operation of the basket frame being necessary for a complete discharge of a group. A discharge carriage is provided for moving the individual sets from the discharging device 5 and conveying said sets to the removing station 6. The said discharge carriage is moved back and forth in longitudinal direction of a chain conveyor system which comprises four chain conveyors 61 provided with rubber rollers and henceforth called chain roller conveyor. The said discharge carriage moves between the two inner chain conveyors of said chain conveyor system, which latter forms the removing station 6. The said discharge carriage has that end thereof which faces the discharging device 5 provided with two grippers adapted to be lowered. These grippers will, when the said carriage reaches its end position at the discharging device 5 catch behind the extensions of the bottom plates U and top plates O. During the subsequent advance of said discharge carriage, the latter pulls the respective set from the discharging device 5 and transfers the same to the quadruple chain roller conveyor 61. During the return of the discharge carriage, the grippers are loaded so that the discharge carriage can return without affecting the set transferred to the chain roller conveyor 61 at the discharge station 6.

In order to be able to subject the finish-pressed pressboard S to its final treatment, it is necessary, first, to remove the top plate O. This is effected at the discharge station 6 by means of a suction device 7. The said suction device 7 comprises a framework 71 which extends transversely to the longitudinal direction of the finish-pressed pressboard S. Inasmuch as for the removal of the top plates O and the preparation of new sets it is necessary to maintain the rhythm dictated by the output of the press unit, a single filling and conveying path will not be sufficient for the proper preparation of new sets. Therefore, according to the present invention, there are provided two filling and conveying paths 8 and 9 respectively arranged at both sides of the press unit and substantially parallel thereto. It is on these filling and conveying paths that at the double rhythm of the discharge of the finish-pressed pressboards S, a new set is being prepared. Accordingly, the frame 71 of the suction device 7 extends to both sides of the discharging station 6 and over the two conveying paths 8 and 9, as illustrated in FIGS. 1 and 3. Framework 71 has a two-gauge track 73 extending in transverse direction with regard to the press unit and located above the discharging station 6 and the two paths 8 and 9. Movably arranged on said track 73 is a suction carriage 72 equipped with two suction devices 78 and 79. The arrangement of the suction devices 78 and 79 on the suction carriage 72 is such that the longitudinal axis of one suction device is aligned with the longitudinal axis of the discharging station 6, whereas the longitudinal axis of the second suction device is aligned with the longitudinal axis of one of the paths 8, 9. The drawing shows the alignment of the longitudinal axes of the discharging station 6 and of the suction device 78 and also shows the alignment of the longitudinal axes of the conveying path 9 and suction device 79. In the illustrated position of the suction carriage 72, a top plate O picked up by the suction device 79 is being deposited on the material P to be pressed, which material was previously deposited on a bottom plate U and together with the latter was moved along the path 9 to the station 91 laterally of the discharge station 6. Similarly, the drawing shows the suction device 78 at the discharge station 6 in the process of lifting a top plate O from a pressboard S. As soon as the suction device 79 has released the top plate O onto the material P to be pressed for a new set, the suction carriage 72 moves toward the right into the position indicated by dash-lines. The suction device 78 with the picked-up top plate O will then occupy a position above press material P which, on a bottom plate U, has moved to the depositing station 81. In this position of the suction device 78, the top plate O is deposited upon the material P. In the meantime, the suction device 79 which is now above the discharge station 6, picks up a top plate O from a further pressboard S which was moved to the discharge station 6 from the discharging device 5. In this way, the top plates O are at a rhythm withdrawn from the sets which are discharged from the discharging device 5 of the cooling or conditioning press 4. The thus picked-up top plates O are, at twice the rhythm of the discharge, deposited on the material P to be pressed of the new sets being prepared which are being conveyed on the paths 8, 9. As soon as the finish-pressed set has its top plate O removed, the remainder of each set is conveyed by the chain roller conveyor 62 to the separating station 63 at which the finish-pressed pressboard S is removed from the bottom plate U and conveyed to a place for further processing. The now remaining bottom plate U is from the separating station 63 conveyed by the chain roller conveyor 64 to the end station 65 and from here the respective bottom plates are, through transverse conveyor 68, 69 alternately transferred to the starting station 82 of path 8 and to the starting station 92 of path 9. In the path of the diagrammatically illustrated chain roller conveyor 64 there may be provided a device for cleaning the bottom plates U, and a stacking device for stacking said bottom plates, if this should be necessary. From the starting station 82 and 92, respectively, the bottom plates U are conveyed along the two paths 8 and 9 at a double rhythm of the discharge from the discharging device 5. On their way, the bottom plates move below loading chutes 99 of any desired design. The material to be pressed passes through said chutes onto the bottom plates U. The bottom plates U loaded in this way again with material to be pressed will, at a rhythm, alternately be conveyed to the depositing stations 81 and 91, respectively. At said depositing stations 81 and 91, the top plates O are by suction devices 78, 79 deposited in the manner described above. Each depositing station 81, 91 is simultaneously designed as device for introducing the completely prepared sets which are then conveyed to pre-pressing devices 84 and 94, respectively. Each introducing device is formed by a chain roller conveyor and a feeding carriage which is substantially of the same design as the pulling-out carriage at the discharge carriage 6. However, the grippers engage the rear edges of the bottom plate U and top plate O pertaining to the respective set and push the respective set during the movement of the introducing carriage so that the set will pass into the pre-pressing devices 84 and 94, respectively. In the devices 84 and 94, the material P between the respective bottom plate U and top plate O is subjected to a pre-pressing operation whereby it will be compressed. After the pre-pressing device has opened, the pre-pressed set is transferred from the device 85, 95 to the respective adjacent chain roller conveyor 86, 96. For purposes of withdrawing the sets from the pre-pressing device 84, 94, there is provided a withdrawing carriage similar to that of the discharging station 6 with a corresponding chain roller conveyor pertaining to the device 85, 95. The chain roller conveyors 86, 96 pass the pre-pressed sets to the end stations 87, 97 of the conveyor path 8 and 9. The pre-pressed sets pass in double rhythm of the discharge from the discharging device 5 alternately to the end stations 87, 97, respectively and are alternately by means of transverse conveyors 88, 98 transferred to a delivery station 10 designed as longitudinal conveyor. The delivery station 10 forming the start of the pressing unit transfers the sets arriving at a rhythm to the introducing device 101 from where the pre-pressed units, by means of an introducing carriage similar to that associated with the pre-pressing devices 84, 94, are conveyed to the loading device 1.

*Operation*

A device described above by way of example for carrying out the method according to the invention, operates in the following manner: It may be assumed that the bottom plates U with the pressboards S thereon passing by means of the chain roller conveyor 62 to the separating station 63, are rhythmically separated from each other so that always one bottom plate U is individually from separating station 63 through chain roller conveyor 64, conveyed to end station 65, and that such bottom plate U here starts its travel through the installation. The first bottom plate U passes through the intervention of the transverse conveyor 68 to the starting station 82 of the conveyor path 8 from where it passes to below the chute 89 to be loaded with new material P to be pressed. In the meantime, the second bottom plate U has passed from end station 65 through the transverse conveyor 69 to the starting station 92 of path 9 and in its turn passes on its way over path 9 to below chute 99 where it is likewise loaded with material P to be pressed. If it is furthermore assumed that the bottom plates U successively arrive at the separating station 63 at a time interval of, for instance, 15 seconds, the movement of the bottom plates U conveyed via path 8 on one hand and path 9 on the other hand, will occur at a corresponding time interval of 30 seconds. The bottom plates U which have been loaded with material P by the chutes 89, 99 pass to the depositing stations 81, 91. At this station, at a rhythm alternately a top plate O is deposited by the suction device 78, 79 on the material P of the respective bottom plate U at stations 81 and 91, respectively. Following the deposit of the bottom plate O upon the material P, the set formed in this way at station 81 is moved into the pre-pressing device 84 where it is subjected to a pre-pressing operation and subsequently is moved out of said pre-pressing device by the device 85. The thus pre-pressed set then passes via the chain roller conveyor 86 to the end station 87 of the conveying path 8. The set formed in a corresponding manner at the depositing station 91 passes through the pre-pressing device 94 and by means of the device 95 and the chain roller conveyor 96, passes to the end station 97 of the conveyor path 9. The sets thus arrive at the end stations 87 and 97 in alternating succession and by means of the transverse conveyors 88, 98 are conveyed to the delivery station 10 so that at this station, at the start of the pressing unit, the simple rhythm of the further transport starts again. The rhythmically arriving sets are by means of the introducing device 101 moved onto the individual shelves of the loading device 1. This is effected in such a way that always every second shelf is loaded, for instance in the sequence 1–3–5 etc. 6–4–2 while for each complete loading, a lifting and lowering movement of the loading basket will be carried out so that the latter, within the short time available, will have to move only short distances upwardly and downwardly. As soon as all of the shelves of the loading device 1 have been loaded with sets, the entire group of sets is simultaneously by means of the bars 14 moved into the open heating press 2. Thereupon, the heating press is closed whereby the heating plates 22 move toward each other and the pressing of the material P between the bottom plates U and top plates O of the various sets, is carried out.

After completion of this pressing operation, the heating plates 22 of the heating press 2 again move away from each other so that the press opens up, whereupon the bars 34 of the discharging and loading device 3 engage extensions of the bottom plates U and top plates O between the respective heating plates 22 and pull the entire group of sets, including the pressboards S, into the discharging and loading device 3. Subsequently, by means of bars 35, the group of sets is conveyed from the device 3 into the cooling or conditioning press 4. The cooling plates 42 of the cooling or conditioning press 4 are then moved toward each other in order to impart a cooling effect through the bottom plates U and top plates O upon the pressboards S whereby said pressboards will be prevented from subsequent warping.

After the cooling or conditioning press 4 has been opened, the entire group of cooled sets is, by means of bars 54, pulled out from the cooling or conditioning press 4 and transferred to the discharging device 5. The discharging basket of device 5 is again, at a rhythm skipping every other shelf, moved upwardly and downwardly so that at a prescribed rhythm, one set at a time will be transferred from the discharge basket to the discharging station 6 where a conveyor 61 removes the respective set. By means of the suction device 78 or 79, the top plate O is at a certain rhythm alternately conveyed to the depositing station 81 and 91, respectively, where said top plate is deposited upon the material P to be pressed, which was previously deposited upon a bottom plate U.

After the top plate has been removed from the respective set as just indicated, the remainder of the set passes to a chain roller conveyor 62 and from there to a separating station 63 at which the finish-pressed pressboard S is removed from the respective bottom plate U and conveyed to a place for further processing. The then remaining bottom plate U passes from the separating station 63 over a chain roller conveyor 64 where it may be subjected to a cleaning operation, and then passes onto the end station 65 at which the circulating cycle starts again in the manner described above.

As will be evident from the above, the method according to the present invention makes it possible, in spite of a considerably reduced pressing time of the heating press 2, to maintain a practically continuous working cycle of the entire installation so that the heating press 2 can be exploited to the full extent while nevertheless a proper quality of the pressboards being made, will be assured. The quality improvement is greatly aided by the employment of the top plates O which protect the material P to be pressed and loaded on the bottom plates U against outer harmful influences. At the same time, a more symmetric heating will be assured in the heating press and also a more uniform cooling in the cooling or conditioning press.

It is, of course, to be understood, that the present invention is, by no means, limited to the particular construction shown in the drawings, but also comprises any modifications within the scope of the appended claims.

The discharging and loading devices which may advantageously be employed in connection with the present invention are set forth in German Patent No. 1,100,923.

The discharge and feeding carriages with grippers which are mentioned in several paragraphs of the specification are designated with reference numerals 110 and 111 in FIG. 1 of the drawing.

What I claim is:

1. In a method of making pressboards, the steps of: placing material to be pressed to a pressboard between a respective bottom plate and a respective top plate in each of two stations, successively pre-pressing each thus obtained assembly, collecting the pre-pressed assemblies in groups, hot pressing, and cooling the thus obtained group of assemblies; successively removing the top plate of each assembly of said group, lifting the obtained pressboard off each respective bottom plate of said group, conveying said bottom plates to respective ones of said two stations for loading the bottom plates with new material to be pressed.

2. In a method of making pressboards, the steps of: at an assembly station assembling in superimposed arrangement a plurality of sets each composed of a bottom plate and pre-pressed material thereon and a top plate above said pre-pressed material to thereby make up a group of sets; successively hot pressing, and finish pressing the thus made up group; passing the thus finish-pressed group of sets to a discharge station; successively removing from one set at a time of said group the respective top plate of the set; conveying the bottom plate and the pressboard thereon of each set one at a time to a withdrawal station; removing at said withdrawal station the finished pressboard from each bottom plate; conveying the bottom plate of each set individually alternately to a first and a second loading station, loading each bottom plate individually with the material to be pressed at said first and second loading stations respectively; alternately conveying a top plate lifted off from a finish-pressed set at said removal station to said first and second loading stations respectively and depositing on the material loaded on the respective bottom plate to form a set, conveying the thus assembled sets respectively from said first and second loading stations to a first and second precompression station respectively and carrying out a precompression of said sets; and alternately passing the precompressed sets from said first and second precompression station to said assembly station for assembling into groups.

3. In an arrangement for making pressboards between removable top and bottom plates, which comprises a multilayer pressing installation having loading means for receiving sets each consisting of a bottom plate and a top plate and precompressed pressboard material therebetween, hot press means for receiving said sets in groups and hot pressing said pressboard material, finishing press means for receiving said sets in groups from said hot press means and finishing said sets by cooling said sets while preventing warping of the pressboard, and discharging means for receiving groups of said sets from said finishing press means and releasing said sets individually therefrom: top plate removing means arranged near said discharging means for removing the top plate from each successively released set, pressboard removing means for removing each pressboard in each set from the respective bottom plate, first and second lateral conveying means respectively arranged on opposite sides of said pressing installation, dispensing means respectively associated with said first and second lateral conveying means for dispensing material to be pressed, first end conveying means arranged near said pressboard removing means for receiving the respective bottom plate from which the pressboard has been removed and for alternately conveying the respective bottom plate laterally to a respective one of said lateral conveying means to be conveyed thereby to a place below the dispensing means respectively associated with said first and second lateral conveying means for receiving from said dispensing means material to be pressed, said top plate removing means being operable alternately to deposit a top plate picked up thereby on material dispensed by said dispensing means onto a bottom plate therebelow thereby making up a set, a plurality of pre-pressing means respectively associated with said first and second lateral conveying means for pre-pressing a set, and second end conveying means for conveying alternately from said first and second lateral conveying means one set at a time to said loading means.

4. An arrangement according to claim 3, in which said top plate removing means comprises frame means, track means supported by said frame means and extending transversely to and above portions of said first and second lateral conveying means, carriage means movable back and forth on said track means, and means supported by said carriage means for supporting top plates to be conveyed by said carriage means.

References Cited by the Examiner

UNITED STATES PATENTS

| | | |
|---|---|---|
| 2,740,990 | 4/1956 | Miller et al. _____ 264—109 |
| 2,923,968 | 2/1960 | Erickson et al. _____ 264—120 XR |
| 3,026,570 | 3/1962 | Beck et al. _____ 264—120 |

FOREIGN PATENTS

| | | |
|---|---|---|
| 495,265 | 8/1950 | Belgium. |
| 1,024,941 | 4/1953 | France. |
| 1,068,407 | 6/1954 | France. |

ALEXANDER H. BRODMERKEL, *Primary Examiner.*

P. E. ANDERSON, *Assistant Examiner.*